May 26, 1970     H. D. DAIGH     3,513,816
EXHAUST RECYCLE SYSTEM FOR AN INTERNAL COMBUSTION ENGINE
Filed May 20, 1968     2 Sheets-Sheet 1
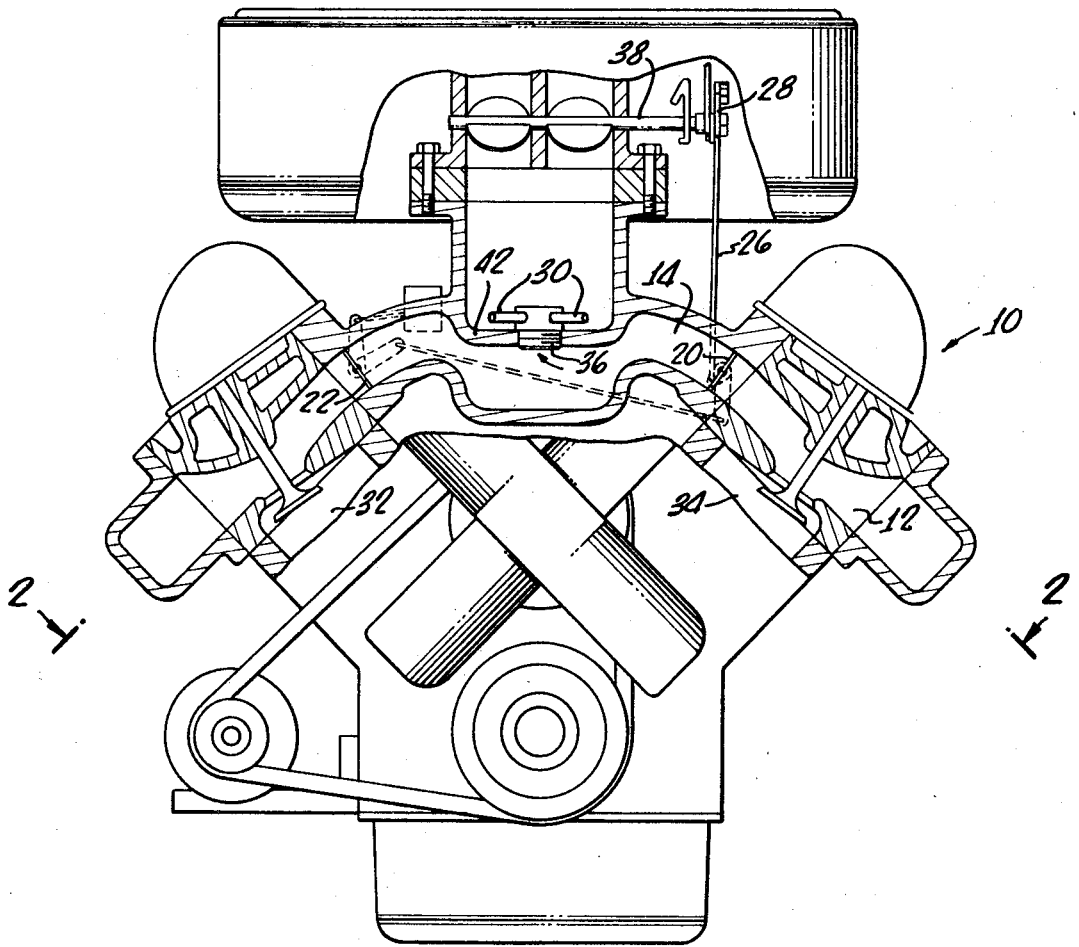
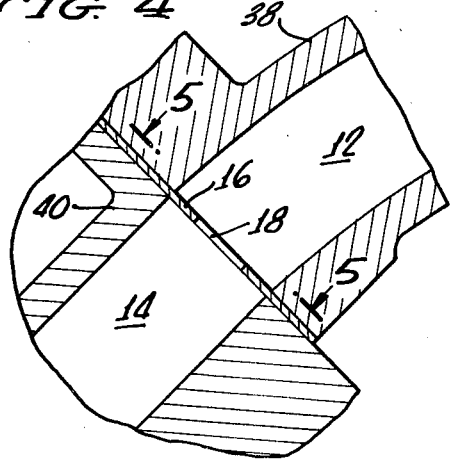
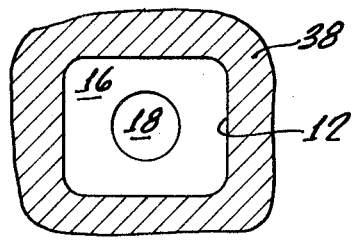
INVENTOR.
HAROLD D. DAIGH
BY
Donald W Canady
ATTORNEY.

May 26, 1970     H. D. DAIGH     3,513,816
EXHAUST RECYCLE SYSTEM FOR AN INTERNAL COMBUSTION ENGINE
Filed May 20, 1968     2 Sheets-Sheet 2

INVENTOR.
HAROLD D. DAIGH
BY Donald W. Canady
ATTORNEY.

3,513,816
EXHAUST RECYCLE SYSTEM FOR AN INTERNAL COMBUSTION ENGINE

Harold D. Daigh, Rolling Hills Estate, Calif., assignor to Atlantic Richfield Company, Philadelphia, Pa., a corporation of Pennsylvania
Filed May 20, 1968, Ser. No. 730,568
Int. Cl. F02m 25/06, 31/08
U.S. Cl. 123—119                                14 Claims

ABSTRACT OF THE DISCLOSURE

This application discloses an improvement in an exhaust recycle system for an internal combustion engine wherein means for controlling the flow of exhaust gas recycled from the heat riser into the induction system are positioned in said heat riser to regulate the flow of exhaust gas flowing both through said heat riser to heat said induction system, and into said induction system through a recycle conduit. The flow of the exhaust gases through the heat riser is limited according to one embodiment, by a restrictive orifice positioned between the exhaust manifold and the heat riser passageway, thereby controlling the temperature of the intake manifold. In a second embodiment valve means which may be employed to regulate the amount of exhaust gas recycled, are operatively positioned in the heat riser passageway. The present disclosure also includes a method for operating an internal combustion engine employing exhaust gas recycle, by enrichening the air-fuel mixture in the carburetor to compensate for the oxygen content of the exhaust gas recycled into the induction manifold.

---

My present invention relates to an exhaust recycle system for an internal combustion engine wherein exhaust gas is recycled from the heat riser into the induction system and wherein means are provided in the exhaust system for controlling the amount of exhaust gas admitted to the heat riser and the amount of exhaust gas recycled from said heat riser into said induction system.

It has been proposed to recirculate exhaust gas to control the atmospheric exhaust emission of nitrogen oxides from an internal combustion engine. Since the heat riser is the coolest portion of the exhaust system in a typical internal combustion engine, it is desirable to withdraw exhaust gas for recycle into the induction system from this region. The exhaust gas to be recycled is still hot, however, and introduces considerable heat into the air-fuel mixture which is introduced into the combustion chambers. Because of the increase in heat in the air-fuel mixture due to the injection of hot exhaust gas recycle, the usual heating of the induction system by the heat riser may cause excessive heating of the air-fuel mixture and consequently the charge may be overexpanded which may result in a reduction of engine power, thus causing an engine condition known as "stumble." Overheating may also cause vapor lock if the carburetor becomes too hot and in extreme heating situations, flame propagation may result.

Accordingly, it is an object of my present invention to provide an internal combustion engine wherein the heating of the induction system by the hot exhaust gases passing through the heat riser is effectively controlled.

It is also an object of my present invention to provide means for controlling the amount of exhaust gas passed from the exhaust manifold into the heat riser passageway.

In the exhaust recycle system, described in my U.S. Pat No. 3,237,615, issued Mar. 1, 1966, a system is shown wherein an exhaust recycle control valve is positioned in a recycle conduit within or adjacent the induction system. Positioning of the recycle control valve in the induction system causes some blockage of the induction system and does not provide means for controlling the amount of exhaust gas admitted through the heat riser from the exhaust manifold for heating the induction manifold.

Accordingly, it is another object of my present invention to control, with a single mechanism, the rate or amount of exhaust gas recycled into the induction system and the amount of induction manifold heating with exhaust gas flowing through the heat riser. It is also an object of my present invention to provide a simplified and improved exhaust recycle control system.

At low and constant speeds in systems utilizing the exhaust recycle system of my aforementioned patent, the recycle between 15 and 25 percent exhaust gas into the induction system below the carburetor results in addition of some oxygen into the air-fuel mixture charged to the combustion chambers which may cause surge and/or stumbling at part throttle and constant speed since the mixture may be too lean.

Accordingly, it is a further object of my present invention to compensate for the introduction of air into the intake manifold.

Other objects and a more complete understanding of my present invention will be come apparent from the following specification when taken in conjunction with the appended claims and the drawings, wherein:

FIG. 1 is an elevation view, partly in section, showing a V–8 internal combustion engine employing the apparatus of my present invention;

FIG. 4 is an enlarged sectional view of an internal combustion engine according to my present invention showing the passageway between the exhaust manifold and the heat riser; and FIG. 5 is a sectional view taken on line 5—5 of FIG. 4 showing the plate and orifice utilized in FIG. 4.

Figure 2:
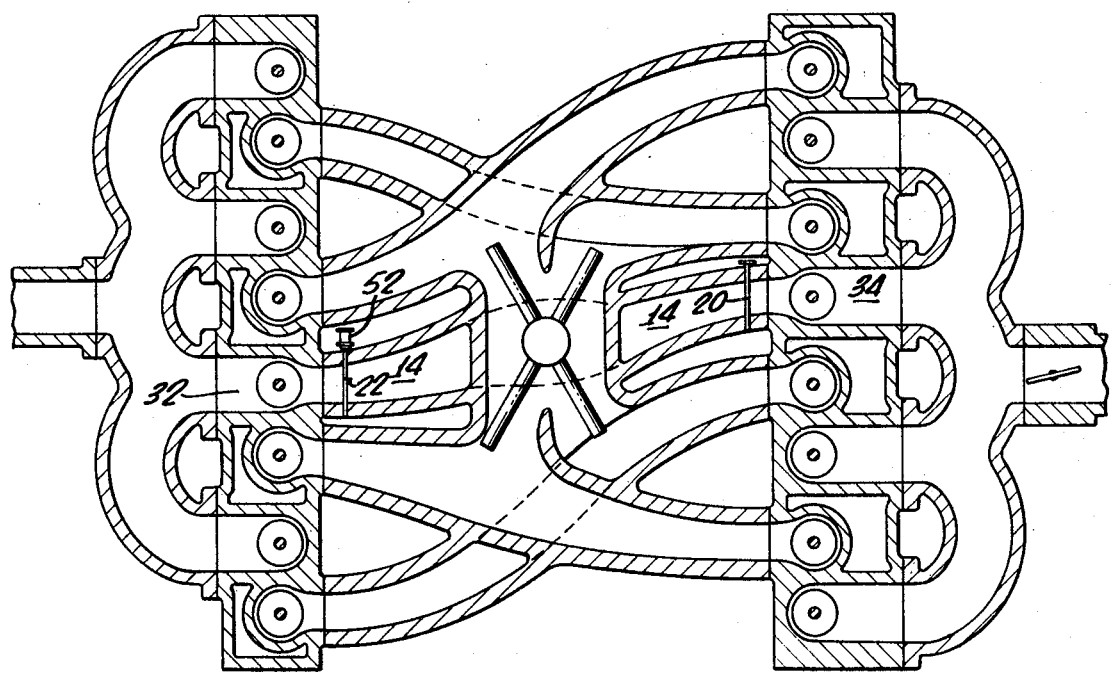
FIG. 2 is a plan view, partially in section, taken on line 2—2 of FIG. 1.
Figure 3:
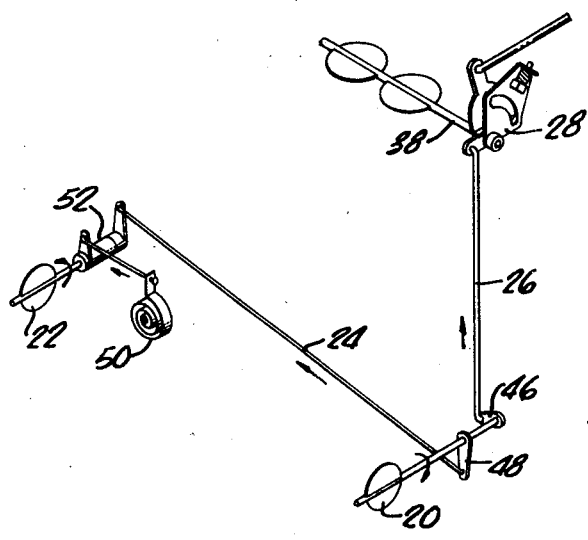
FIG. 3 is a perspective view of the heat riser valves and linkage with the accelerator control mechanism.

Briefly described, FIGS. 1 and 2 show a V–8 internal combustion engine showing the exhaust manifold 12 at a section taken through the inside cylinders which supply exhaust gas to the heat riser passageway 14. Means for controlling the exhaust gas passing from the exhaust manifold 12 through the heat riser are shown in FIGS. 1–3 where the butterfly valves 20 and 22 are provided in the heat riser passageway 14 and connected for conjoint operation through linkages 24 and 26 to the accelerator mechanism controls 28. The recycle valve control apparatus 28 is described more fully in copending application Ser. No. 673,843 of H. D. Daigh and Clifford H. Collins for "Exhaust Recycle Control Mechanism," and is designed to close the recycle valves 20 and 22 at idle and wide open throttle settings of the accelerator mechanism (not shown) and open said valves, as will be hereinafter described, at part throttle positions of said accelerator mechanism. The heat riser valve 20 in the embodiment shown in FIGS 1–3 is the control valve for admitting exhaust gas to be recycled into the induction system through the heat riser 14 and recycle conduits 30 which admit exhaust gas into the induction system proximate the intake valves, as well as the means for controlling flow of exhaust gas through the heat riser 14.

Another means for controlling the flow of exhaust gas into the heat riser is shown in FIG. 4 where a plate 16 having an orifice 18 therein is positioned in the passageway between the exhaust manifold 12 and the heat riser 14.

An exhaust recycle system is shown in FIGS. 1 and 2, in which system exhaust for recirculation is taken from the two inside cylinders 32 and 34 of the V–8 configuration shown, which are connected directly to the heat riser cross over 14.

The exhaust gas used for recirculation is taken directly from the heat riser or stove area 14 through orifice 36 and inducted down each main runner (not shown) of the intake manifold by means of distribution tubes 30 in accordance with my aforementioned Pat. No. 3,237,615. As discussed in said patent, the purpose of the distribution tubes is twofold: (1) to prevent deposit formation in the carburetor throttle plate area by keeping the recycled exhaust away from this region and (2) to improve fuel distribution by providing a limited amount of heat exchange surface. In the embodiment shown in FIGS. 1 and 2, the heat riser valves 20 and 22 are also recycle rate control valves and are connected to the throttle shaft 38 by linkages 24 and 26 and control mechanism 28, so that the amount of opening of valves 20 and 22 is regulated by the throttle position. As stated in my aforementioned patent and the aforementioned application, the linkage is designed to close the valve at idle (and deceleration), open the valve during part throttle, and close it again (instantaneously) at full throttle. Although a chain and sprocket linkage as shown in my aforementioned Pat. No. 3,237,615 may be used, the preferable linkage is the over-center linkage shown in my aforementioned application Ser. No. 673,843.

In the system shown in FIGS. 4 and 5, the flow of exhaust gas through the heat riser is controlled or limited by shim type orifices 18 which may be used between the head 40 and the manifold 38 to restrict the maximum amount of exhaust that can be recycled to any one cylinder.

Figure 6:
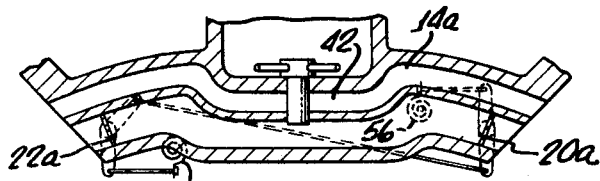
FIG. 6 is a sectional view of an engine illustrating a modification of my present invention.

FIG. 6 shows a modification of the system shown in FIGS. 1–3, wherein a heat riser divider 56 is employed to permit passage of exhaust gas through the heat riser through channel 14a to heat the intake manifold 42 while the recycle control valves 20a and 22a are closed. In this embodiment the valves 20a and 22a will not open until the engine warms up sufficiently to actuate the thermal actuator 58.

In operating the engine shown with exhaust recirculation, I have found that because of the dilution of the air-fuel mixture in the intake manifold by the injection of recycled exhaust gas therein, sufficient enrichment of the part-throttle low speed carburetor jets (not shown) and the main jets (not shown) is necessary to compensate for the amount of air injected into the charge via the exhaust recycle. A reduction in the air-fuel ratio of approximately one-half point has been found generally satisfactory, that is, a reduction of the air-fuel ratio, for example, from 14.5 to 14.0. Since there is substantially no exhaust gas recycled at idle and wide-open throttle settings of the accelerator mechanism, the idle jets and the wide-open throttle need not be adjusted, i.e. only at low speed and constant speed is the charge diluted with exhaust gas recycled by the system described above. Hence, according to my present invention the overall air-fuel ratio is maintained constant in engines operated with exhaust recycle, by enrichening the low speed and main jets of the carburetor. Of course, the amount of compensation necessary will vary with different engines since some engines will run leaner than others.

While my present invention has been described with respect to a V–8 or V-type engine, it is to be understood that my present invention is also useful with an L-head or In-line engine where there is no heat riser cross over, but rather the intake manifold and the exhaust manifold are adjacent each other.

Other changes which may be necessary in operating an internal combustion engine with exhaust recycle are the use of hotter spark plugs, recalibration of the choke and use of various approaches for retaining manifold mixture temperature at or near normal levels. It is preferable in my present invention to maintain the quantity of exhaust gas recycled in the range of 15 to 25 percent of the air-fuel mixture. It is preferable to operate with as much exhaust recycle as possible to effect maximum reduction of nitrogen oxides in the exhaust gas although the maximum percentage which can be recirculated is limited by rough engine and loss of power. The reduction of spark plug insulator nose temperature may be used as a rough approximation of the percentage recycled if a correlation is made between spark plug temperature and recycle percentage.

By use of the valves 20 and 22 operatively connected to the throttle shaft 38 with recycle control mechanism 28, a separate recycle rate control valve is unnecessary. As best shown in the schematic view FIG. 3, the carburetor throttle valve 37 is connected to throttle shaft 38 which is operatively connected to control the recycle rate control valves 20 and 22 through an over-center mechanism 28 which is designed to close recycle valve 20 and 22 at idle and wide open throttle and open said recycle valve for maximum recycle for exhaust gas into the induction system at part throttle settings of the accelerator mechanism (not shown) which actuate throttle shaft 38.

The over-center mechanism 28 is designed to instantaneously close recycle rate control valves 20 and 22 as the accelerator mechanism goes past part throttle position to wide open throttle position. The valve 20 is controlled by the accelerator mechanism through linkage 26 which is connected through toggles 46 and 48 to control valve 20. Valve 22 is controlled with valve 20 through linkage 24. During engine warmup, valve 22 stays closed while valve 20 is opened by linkage 26. Valve 22 is opened as the heat of the engine becomes sufficient to actuate the thermal element 50. The thermal element 50 opens valve 22, valve 22 is then connected to the linkage 24 through a conventional clutch mechanism 52, such as a secondary throttle lockout, conventional on many cars, and is thereafter actuated with valve 20 until the engine temperature drops sufficiently to deactivate thermal element 50.

The purpose in having the clutch arrangement to leave valve 22 closed and valve 20 open, is to permit exhaust recycle and heating of the intake manifold with exhaust gas through the heat riser during engine warmup. The valve 22 opens when the engine becomes sufficiently hot to actuate the bi-metallic element 50 to permit circulation of the exhaust gases through the heat riser, thus reducing the intake manifold heating effect at idle and wide open throttle when the recycle valves are closed.

The amount of exhaust gas admitted through the heat riser 14 according to my present invention is such as to control the temperature of the intake manifold to about 120–130° F. It is estimated that about 5 to 10 percent of the exhaust gas must be flowing through the heat riser to effect this temperature control.

While my invention has been described herein with a certain degree of particularity with reference to specific embodiments, it is to be understood that the scope of my invention should not be limited to the above description but should be afforded the full scope of the appended claims.

I claim:
1. An exhaust system for an internal combustion engine having combustion chambers and valved exhaust outlets leading therefrom into an exhaust manifold with a portion of the exhaust gas from said exhaust manifold passing through a heat riser, and an induction system including a carburetor for feeding an air-fuel mixture to said combustion chambers, said heat riser being in heat exchange relationship with said induction systems, and means for recycling a portion of said exhaust gas from said heat riser into said induction system, the improvement comprising, in combination: valve means in the heat riser passageway proximate said exhaust manifold for controlling the flow of exhaust gas from said exhaust manifold into said heat riser.

2. In an exhaust recycle system for an internal combustion engine having a combustion chamber and a valved outlet leading therefrom with a portion of the exhaust gas passing through a heat riser, a carburetor having a throttle valve actuated by an accelerator mechanism having idle position, part-throttle position, and floorboard positions thereon, and an induction manifold connecting said carburetor to said combustion chamber, said heat riser being in heat exchange relationship with said induction manifold the improvement comprising in combination: means for recycling exhaust gas from said heat riser into said induction manifold, a valve in the heat riser passageway proximate the outlet of said combustion chamber for controlling the amount of said exhaust gas flowing into said heat riser.

3. An exhaust recycle system for a V-type internal combustion system having two banks of combustion chambers with exhaust manifolds adjacent each bank for receiving exhaust gas from said combustion chambers and an induction system including a carburetor which includes an accelerator mechanism for feeding an air-fuel mixture to said combustion chambers, a heat riser extending between the exhaust manifolds of said banks and being in heat exchange relationship with said induction system, the improvement comprising in combination:
   means for recycling a portion of the exhaust gas from said heat riser into said induction system,
   valved means in said heat riser proximate each of said exhaust manifolds to regulate the exhaust gas flowing into said heat riser from each of said exhaust manifolds, and
   means for conjointly operating said valved means with said carburetor accelerator mechanism.

4. The apparatus of claim 3 including means for actuating one of said valves independently, temperature responsive means for opening the other valve, and a clutch mechanism operatively connected to said first valve to functionally connect said valve for conjoint operation with said accelerator mechanism subsequent to opening of said second valve.

5. The apparatus of claim 4 wherein said exhaust gas recycled from said heat riser into said induction system is removed from said heat riser intermediate said two heat riser valves.

6. An exhaust system for an internal combustion engine having combustion chambers and valved exhaust outlets leading therefrom into an exhaust manifold with a portion of the exhaust gas from said exhaust manifold passing through a heat riser, and an induction system including a carburetor for supplying an air-fuel mixture to said combustion chambers, said heat riser being in heat exchange relationship with said induction system, and means for recycling a portion of said exhaust gas from said heat riser into said induction system, the improvement comprising, in combination: restrictive orifice means positioned between the exhaust manifold and the heat riser passageway for restricting the flow of exhaust gas from said exhaust manifold into said heat riser to prevent excessive heating of said intake manifold.

7. The apparatus of claim 6 wherein said restrictive orifice means is of a size to control heating of said intake manifold to 120 to 130° F.

8. The apparatus of claim 6 wherein said restrictive orifice means is a plate with an orifice therein.

9. The apparatus of claim 6 wherein said restrictive orifice means is performed integrally with said exhaust manifold and has an orifice therein of the size to permit only 5 to 10 percent of said exhaust gas in said exhaust manifold to pass through said heat riser.

10. An exhaust recycle system for an internal combustion engine having combustion chambers and exhaust outlets leading therefrom into an exhaust manifold with a portion of said exhaust gas from said exhaust manifold passing through a heat riser, and an induction system including a carburetor for supplying an air-fuel mixture to said combustion chambers, the improvement comprising:
   means dividing said heat riser into two channels,
   said first channel being in heat exchange relationship with the intake manifold;
   means for recycling exhaust gas from said second channel to said intake manifold, and
   valve means in said second channel for controlling the amount of exhaust gas admitted thereto and recycled into said intake manifold.

11. An exhaust recycle system for an internal combustion engine having combustion chambers and exhaust outlets leading therefrom into an exhaust manifold with a portion of said exhaust gas from said exhaust manifold passing through a heat riser, and an induction system including an intake manifold and a carburetor which includes on accelerator mechanism for supplying an air-fuel mixture to said combustion chambers, the improvement comprising: means for dividing said heat riser into a first and second channel, said first channel being in direct heat exchange relationship with said intake manifold, valve means in said second channel for controlling the flow of exhaust gas from said exhaust manifold into said second channel, means for recycling exhaust gas from said second channel into said induction system, and temperature responsive means for actuating said valve means and connecting means for operating said valve means conjointly with the accelerator mechanism of said carburetor only when said temperature responsive means have been actuated.

12. A method for operating an internal combustion engine having an exhaust recycle system wherein the exhaust gas is recycled into the induction system of said engine comprising the steps of:
   (a) controlling the flow of exhaust recycle into said induction system conjointly with the carburetor throttle valve accelerator mechanism, and
   (b) enriching the fuel mixture charged into said induction system to compensate for the oxygen content of said exhaust gas recycle into said induction system.

13. The method of claim 12 wherein the air-fuel ratio is lowered one-half number.

14. The method of claim 12 wherein said air-fuel ratio is enriched from about 14.5 to 14.

References Cited
UNITED STATES PATENTS

| | | | |
|---|---|---|---|
| 2,317,582 | 4/1943 | Bicknell | 123—119 |
| 3,146,768 | 10/1964 | Osborne | 123—119 |
| 3,204,621 | 10/1965 | Holliday | 123—119 |
| 3,237,615 | 3/1966 | Daigh | 123—119 |
| 3,380,442 | 4/1968 | Johnson | 123—119 XR |

WENDELL E. BURNS, Primary Examiner

U.S. Cl. X.R.
123—122